US006941368B1

(12) United States Patent
Hamzy et al.

(10) Patent No.: US 6,941,368 B1
(45) Date of Patent: Sep. 6, 2005

(54) PROTECTING RESOURCE URLS FROM BEING SERVED WITHOUT A BASE WEB PAGE

(75) Inventors: Mark Joseph Hamzy, Round Rock, TX (US); Michael Richard Cooper, Austin, TX (US); Mark Wayne VanderWiele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 09/583,959

(22) Filed: May 31, 2000

(51) Int. Cl.$^7$ .............................................. G06F 15/16

(52) U.S. Cl. ....................................... 709/225; 709/219

(58) Field of Search ............................... 709/219, 227, 709/224, 229, 225; 707/501.1; 705/14

(56) References Cited

U.S. PATENT DOCUMENTS

| 5,774,670 | A | 6/1998 | Montulli ..................... 709/227 |
| 5,826,242 | A | 10/1998 | Montulli ..................... 705/27 |
| 5,835,712 | A | 11/1998 | DuFresne .................... 709/203 |
| 5,920,859 | A | 7/1999 | Li ................................ 707/5 |
| 5,968,125 | A * | 10/1999 | Garrick et al. .............. 709/224 |
| 6,226,677 | B1 * | 5/2001 | Slemmer .................... 709/227 |
| 6,240,455 | B1 * | 5/2001 | Kamasaka et al. .......... 709/229 |
| 6,360,235 | B1 * | 3/2002 | Tilt et al. ................. 707/501.1 |
| 6,385,592 | B1 * | 5/2002 | Angles et al. ................ 705/14 |
| 6,539,424 | B1 * | 3/2003 | Dutta ......................... 709/219 |
| 6,591,248 | B1 * | 7/2003 | Nakamura et al. ............ 705/14 |

FOREIGN PATENT DOCUMENTS

| GB | 2327514 | 6/1998 |
| JP | 10124518 | 10/1996 |
| JP | 10222415 | 2/1997 |
| JP | 10333966 | 5/1997 |
| JP | 11025098 | 6/1997 |

OTHER PUBLICATIONS

Tweney, the tweney report Internet business news and analysis by Dylan Tweney, Billboard economy, Oct. 4, 1999.*
Attention Editors: Deep Link Away, Mar. 30, 2000.*
Hoffman, Linking and Crawling Issues, 2001.*

(Continued)

*Primary Examiner*—Larry D. Donaghue
*Assistant Examiner*—Jungwon Chang
(74) *Attorney, Agent, or Firm*—Marilyn Smith Dawkins (57) ABSTRACT

The system, method, and program of the invention enables a Web server to ensure that any prerequisite resource is served before, or in conjunction with, a requested resource. Upon receipt of a request for a resource, e.g., a page, the Web server determines if the requested resource requires a prerequisite resource. If it does, a different resource is sent that has been modified to include the prerequisite resource. In a further embodiment, the Web server keeps track of each client's request for a prerequisite resource in order to determine whether the prerequisite resource had been previously requested when a resource is requested that requires the prerequisite resource. The different resource is sent if the resource requires a prerequisite resource and if it is determined that the previous request by the requester for the prerequisite resource has not been made within a configurable amount of time or within a predetermined number of hits.

18 Claims, 7 Drawing Sheets

OTHER PUBLICATIONS

Tysver, Linking and Liability, BitLaw A resource on Technology Law, 2000.*

Foster, Is Your Web Site Legal?, 2000.*

Kaplan, Legality of 'Deep Linking' Remains Deeply Complicated, Cyber Law Journal, Apr. 7, 2000.*

Stephen Downes, "Deep Links", Posted to DEOS-L, Aug. 14, 1999.*

Rabindranath Dutta, claims of U.S. Appl. No. 09/434,855, Nov. 4, 1999, International Business Machines Corporation.
*

U.S Appl. No. 09/439,053, filed Nov. 12,1999, USA, *Restricting Deep Hyperlinking on the World Wide Web*, R. Dutta.

"Is Linking Always Legal? the Experts Aren't Sure" -C.S. Kaplgan, New York times, Issue Aug. 6, 1999.

"Persistent Context for World Wide Web Browsers", IBM Technical Disclosure Bulletin, vol. 40, No. 02, Feb., 1997, p. 215-216.

* cited by examiner

Original WEB Page A

```
<HTML>
<HEAD>
    <TITLE> Web Page Sample A</TITLE>
</HEAD>

<BODY>

<A HREF="http://www.advertiserA.com> <IMG SRC="Paid Advertisement A"> </A>
<BR>
<IMG SRC="MyCoolImage.gif">
<BR>
<A HREF="http://www.advertiserB.com> <IMG SRC="Paid Advertisement B"> </A>

</BODY>
</HTML>
```

Webpage A.com

PROTECTING RESOURCE URLS FROM BEING SERVED WITHOUT A BASE WEB PAGE

BACKGROUND OF THE INVENTION

1. Field of the Invention

This invention relates to accessing resources (e.g., pages) over a network (e.g., over the Web using URLs), and more specifically to protecting a resource URL from being served without the base Web page also being served.

2. Description of the Related Art

As computational devices continue to proliferate throughout the world, there also continues to be an increase in the use of networks connecting these devices. Computational devices include large mainframe computers, workstations, personal computers, laptops and other portable devices including wireless telephones, personal digital assistants, automobile-based computers, etc. Such portable computational devices are also referred to as "pervasive" devices. The term "computer" or "computational device", as used herein, may refer to any device which contains a processor and some type of memory. The networks connecting computational devices may be "wired" networks, formed using lines such as copper wire or fiber optic cable, wireless networks employing earth and/or satellite-based wireless transmission links, or combinations of wired and wireless network portions. Many such networks may be organized using a client/server architecture, in which "server" computational devices manage resources, such as files, peripheral devices, or processing power, which may be requested by "client" computational devices. "Proxy servers" can act on behalf of other machines, such as either clients or servers.

A widely used network is the Internet. The Internet, initially referred to as a collection of "interconnected networks", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite or protocols.

Currently, the most commonly employed method of transferring data over the Internet is to employ the World Wide Web environment, referred to herein as "the Web". Other Internet resources exist for transferring information, such as File Transfer Protocol (FTP) and Gopher, but have not achieved the popularity of the Web. In the Web environment, servers and clients effect data transfer using the Hypertext Transfer Protocol (HTTP), a known protocol for handling the transfer of various data files (e.g., text, still graphic images, audio, motion video, etc.).

There are many sites on the Internet that have a collection of resources such as movies, pictures, music or other works of content. The web page author typically spends a significant amount of time updating and modifying the site. The Web site owner also incurs other costs in maintaining the Web site including, among other items, connection fees and server space. To cover these costs, the Web site owner will make arrangements with advertisers to place their advertisements at the Web site for a fee. The fee arrangement is typically based upon the number of users that visit the Web site. Without advertisers to provide the compensation to cover the costs of operating a Web site, the costs would be passed on the users through higher access fees and registration fees. As such, it s vital to the success of such a web site that any such advertisement be seen by each user that receives the benefit of the Web site through access to any of its content.

Unfortunately, it is common practice for other Web site owners to use the resources from an original Web site without linking to the original owner's Web page. Consequently, when a user clicks on the resource now referenced from the other Web site, the original Web site server will serve the resource. However, since there was no link to the original Web site, only the resource is served and not any of the original Web pages, including any Web pages that may have contained the advertisements. As such, that user would not be exposed to the advertisement. Without the user being exposed to the advertisement, and without the user being tracked as accessing the original Web site, the original Web site owner receives no credit for this user in conjunction with any advertisement arrangement or compensation.

Linking directly to a resource within a Web site without following the links from that Web site, such as from that Web site's Home page, is referred to as deep hyperlinking. Deep hyperlinks from one Web site point directly to resources, i.e., Web pages, or other content, of a different Web site. This may possibly result in bypassing the advertising-rich home pages or other identifying pages for the different Web site. As such, the original source, i.e., the content provider, of the content of a deep link can become obscure.

For clarification, a content provider is used herein to refer to the owner of the content that is being linked to; and a content aggregator is an entity that provides links to the sites of the content providers and may not necessarily provide any original content.

Consequently, legal controversies over deep linking have developed. On the one side, some believe that deep linking should be illegal. For example, intellectual property owners of content rich information, such as movie studios, believe that they have the right to protect their rights to their Web page content by not permitting others to link to their sites that contain copyrighted material without their specific authorization. They believe that property owners who create content should have a right to determine how others experience their Web site. Also, if advertising-rich home pages are bypassed, then the owner of those sites may suffer diminished revenue.

On the other hand, since linking is what the Web is all about, others believe that if links are banned or restrictions are put on linking, then the whole Internet would have to undergo a transformation. The whole point of the Web is for everything to be linked to everything else. The belief by some is that deep linking should be permissible because anyone who creates a Web page in effect grants the cyberspace community at large an implied license to link to it.

The controversies surrounding deep linking were exemplified in a lawsuit between a content provider and a content aggregator over such links. The content provider was an established business within the Internet environment and within the outside physical world. The content provider sold tickets to concerts, plays, sports events, and other events. A customer could buy tickets from the content provider through the Web, by the phone, and by physically going to other outlets. For example, the content provider had arrangements with music stores, shopping malls, and other locations to sell tickets at such given locations. To buy tickets over the Web, a user would access the content provider's home page, and follow links to purchase the desired tickets. While the customer traversed the applicable links from the home page to purchase the desired tickets, the user would see other events and any associated advertising for such other events. It appears that a content aggregator provided a city guide Web site that offered full service to customers which included links to the content provider to buy tickets. Although the content provider still received payment for tickets purchased from users via the content aggregator link, the content provider was not receiving the full benefit of being the owner of its Web site. That is, the content provider was not able to serve each of its customers in its own desired manner since the customers from the content aggregator were being lead deep into the content provider's site avoiding the information provided by the content provider on its home page and subsequent pages. As such, the content aggregator was drawing customers to its own site even though it did not provide the tickets through its own Web server, thereby generating additional advertising revenue for itself.

Currently, one way in which a content provider can protect access to particular information within its Web site is to grant authorization through the use of id's and passwords. If every user becomes authorized through each user's own password, at least the content provider has the means to know how many users are accessing the site and a form of identity of those users. The content provider can use this information as a means for compensation, i.e., by using subscription fees in exchange for authorization, or to use the identifying user information to send advertising promotions to in order to keep the content producer in business. As such, a content provider can protect access to particular information by using passwords which prevent just anyone from going deep inside their page unless authorized. Nevertheless, even if a user has supplied a password and is authorized, the user can still deep link within the authorized set of pages and bypass any required advertisements or other prerequisite information.

A problem with requiring password authorization is that if every content provider required passwords, then a user would have an unmanageable number of different passwords that the user would have to keep track of for all of the different possible content producers the user would access. As such, password authorization schemes on the Internet are burdensome to users, and do not provide the best approach in protecting resources from being served without a prerequisite resource from being served, also.

SUMMARY OF THE INVENTION

It is therefore an object of the invention to protect a resource from being served from a Web server unless the Web server also serves the base Web page or any other prerequisite information, such as advertising, associated therewith.

The system, method and program of the invention enables a Web server to keep track of client requests. Before a resource is served, the client must request the home Web page or other prerequisite resource. Furthermore, if the user has not previously requested the home page or a prerequisite resource, then the requested resource is modified to include the advertisements or home page or other prerequisite information. As such, a given resource is protected from being served unless other prerequisite information, such as advertisements, are also served to the client.

More specifically, when a Web server receives a GET request for a resource from a client, i.e., a requester; the IP address of the requester is provided in the socket information. The Web server stores the IP address of the client in a database, or more specifically in a hash table, which keeps track of the selected request for a configurable amount of time or for a predetermined number of hits. In this way, the Web server maintains a history of each selected request from each client. In addition, each resource requested in each GET request is compared against a configurable table of prerequisite resources. In other words, a given GET request is compared against a table having the prerequisite requests for that given GET request.

If a current GET request has a prerequisite request, the history hash table for the IP address that is making the request is checked for the prerequisite entry. If the prerequisite entry exists, the GET request is processed normally. It the prerequisite request has not been made, the web server detects the deep linking condition and modifies the GET request to retrieve a different or modified resource which matches the data type of the original request. For instance, a different resource may be served, such as the base Web page or home page, or any other page, along with information as to how to get the requested resource.

Alternatively, the requested resource may be modified before being served. For example, the requested resource may be modified to contain the advertising that was contained within a base Web page that was circumvented by the deep link directly to the resource. The requested resource could also be modified to contain any prerequisite resource. As such, the server combines the information to present the user with both the prerequisite resource or information and the requested resource.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1A:
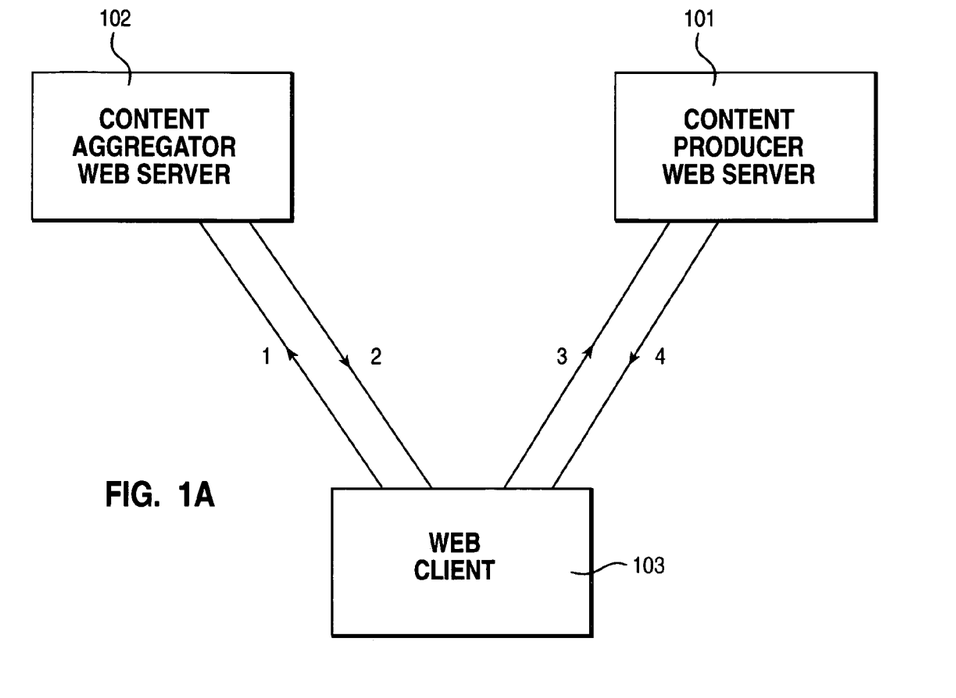
FIG. 1a shows a content producer Web server and a content aggregator Web server in communication with a Web client over a network.

FIG. 1a shows a content producer Web server 101 and a content aggregator Web server 102 in communication with a Web client 103 over communication paths 1, 2, 3, and 4. The Web client 103 first connects to the content aggregator 102 in communication 1 and receives a response in communication 2. The response is a pointer to the content producer which the Web client 103 goes to via communication 3. The Web client 103 receives a response via communication 4. In the prior art, the response 2 is a pointer to a deep hyperlink in the content producer's Web page, and communication 3 goes directly to that deep hyperlink.

In the system, method, and program of this invention, the Web client's communication 3 to the deep hyperlink is processed by the content producer Web server to determine whether or not the requesting client has previously been served the home page or other prerequisite information. By enabling the content producer's Web server to either modify the requested resource or to combine the requested resource with other prerequisite information, the content producer maintains control of the information, including any advertising, that it desires all of its customers to view when accessing its content. The content producer receives the benefit of others linking to its site since it increases the customer base for advertising purposes. Also, all customers see all of the required information as desired by the content producer. At the same time, content aggregators are benefited in continuing to meet their customer's needs by allowing them to send their customers to other sites for additional data and information that the content aggregator does not necessarily maintain.

Figure 1B:
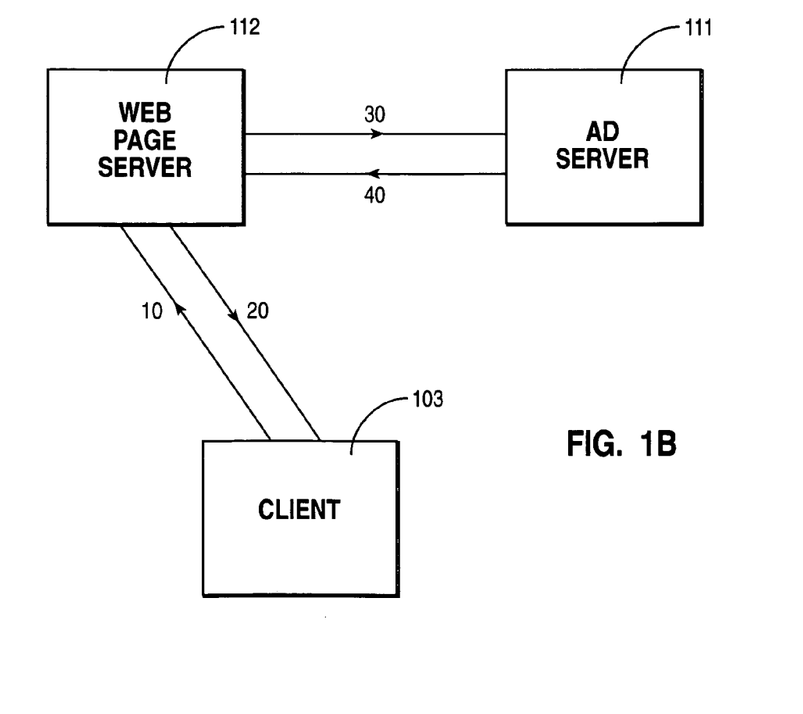
FIG. 1b shows an ad server, a Web page server, and a Web client in communication over a network.

FIG. 1b illustrates another embodiment in which an ad server 111 is in communication with a Web page server 112. When a Web client 103 accesses a Web page server 112 over communication path 10, the Web page server 112 requests the advertisements from the ad server 111 over communication 30 and receives the advertisements over communication path 40. The Web page, with the advertisements, is then sent to the Web client 103 over communication path 20.

Figure 2A:
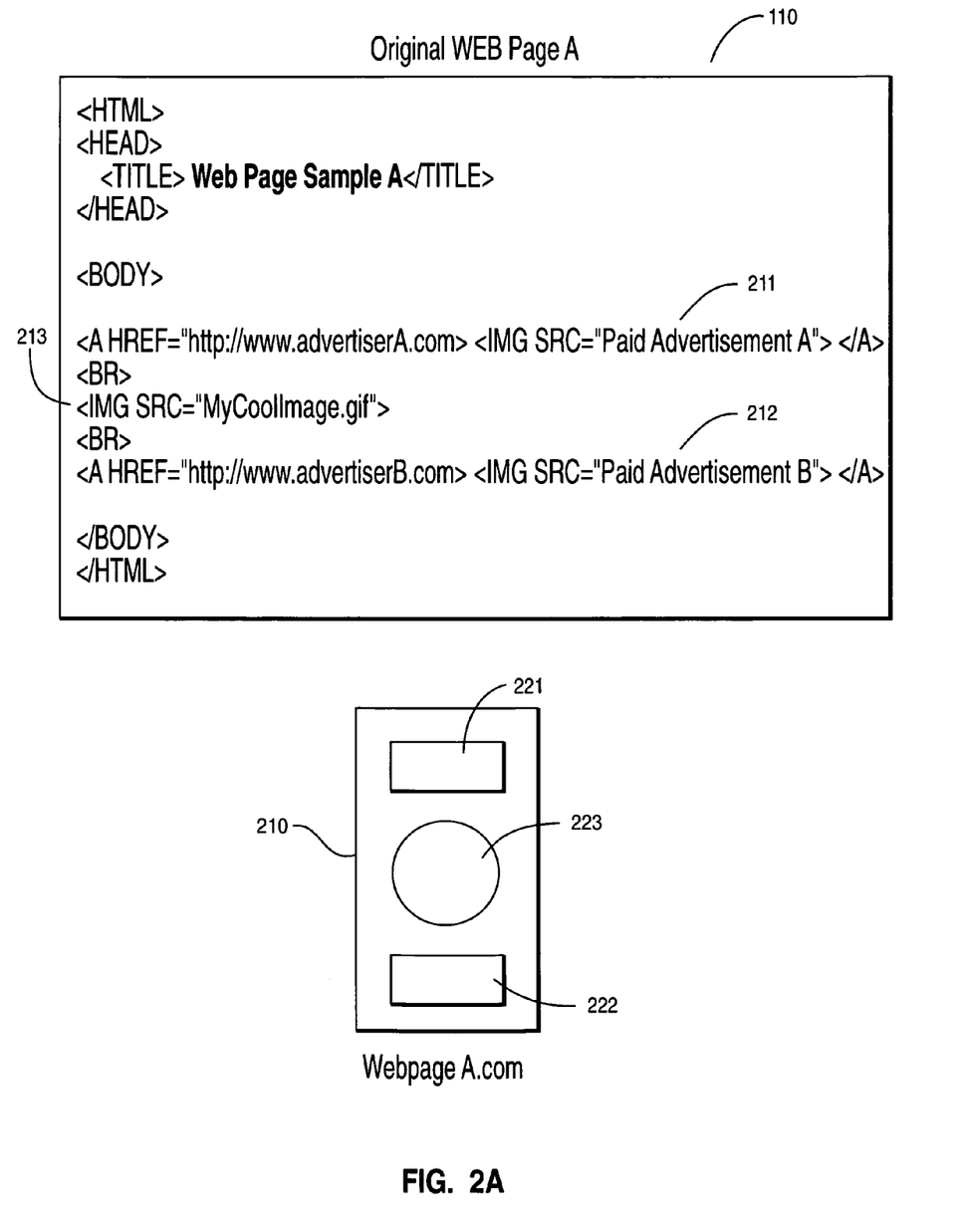
FIG. 2a illustrates a sample Web page shown as Original Web Page A and its displayed layout.

FIG. 2a illustrates a sample Web page shown as Original Web Page A 110 and its corresponding displayed page layout 210. Original Web page A 110 has its main attraction shown as an image source "MyCoolImage.gif" 213 along with two advertisement banners shown as an image source "Paid Advertisement A" 211 and an image source "Paid Advertisement B" 212. The page layout 210 of Original Web Page A 110 is shown as having advertisement A 221 corresponding to image source 211, the page attraction 223 corresponding to image source "MyCoolImage.gif 213, and advertisement B 222 corresponding to image source 212.

Figure 2B:
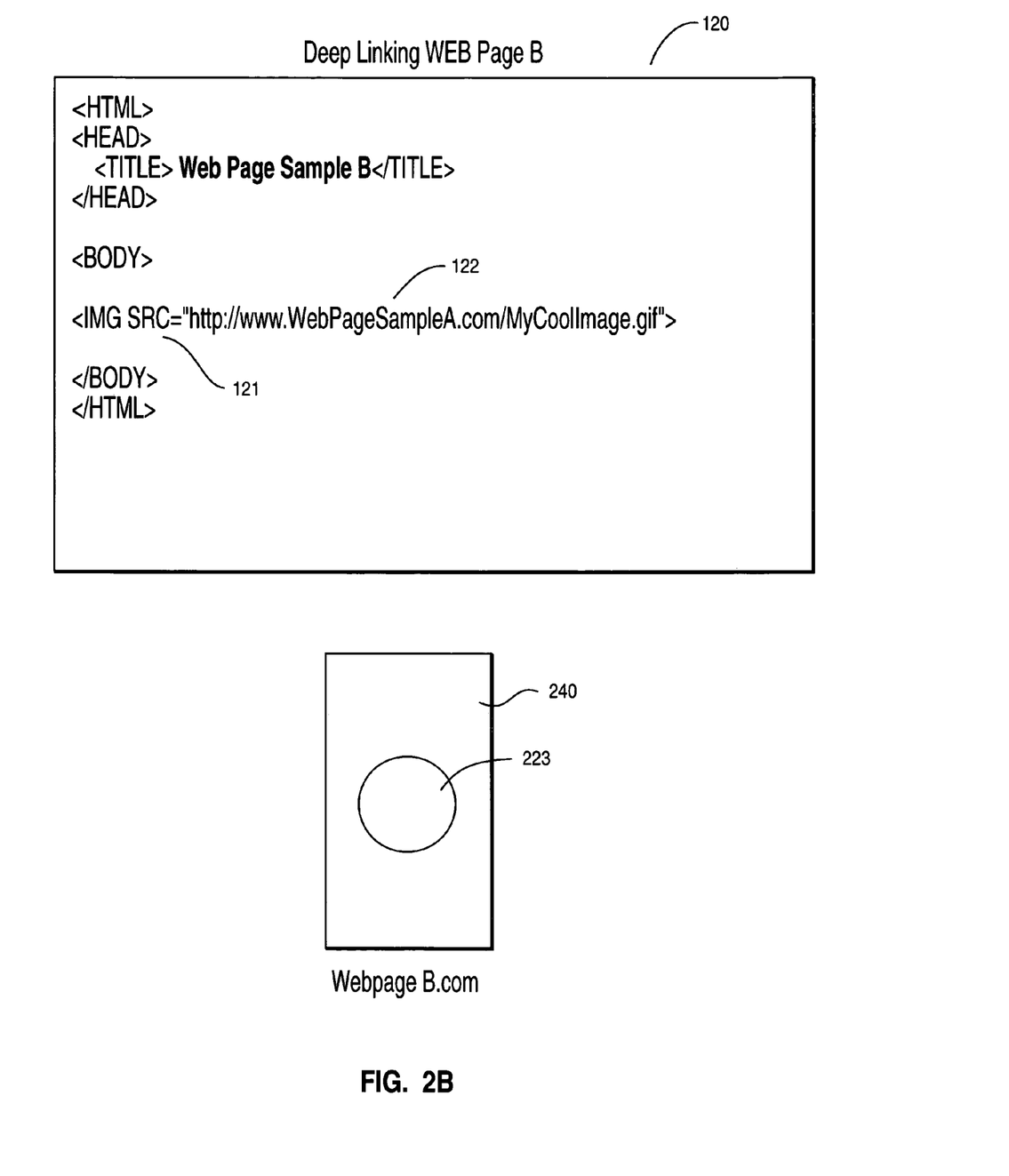
FIG. 2b illustrates a sample Web page shown as Deep Linking Web Page B and its corresponding displayed layout, wherein Deep Linking Web Page B contains a redirected image resource from Original Web Page A but does not contain any of the advertisements.

FIG. 2b illustrates a Deep Linking Web Page B 120 containing a redirected image resource 121 from Web Page A as indicated by www.WebPageSampleA.com/MyCoolimage.gif 122. A page layout of the Deep Linking page B 240 shows that Web page B performs a deep link to the Web page A attraction, image resource 223 (i.e., MyCoolImage.gif), which is displayed to the user while avoiding any of the advertisements.

As such, FIGS. 2a and 2b illustrate the use of deep linking to avoid critical content. The user will be have an incentive to use Web Page B in order to avoid the performance and annoyance factors of the advertisements of Web Page A.

Figure 3:
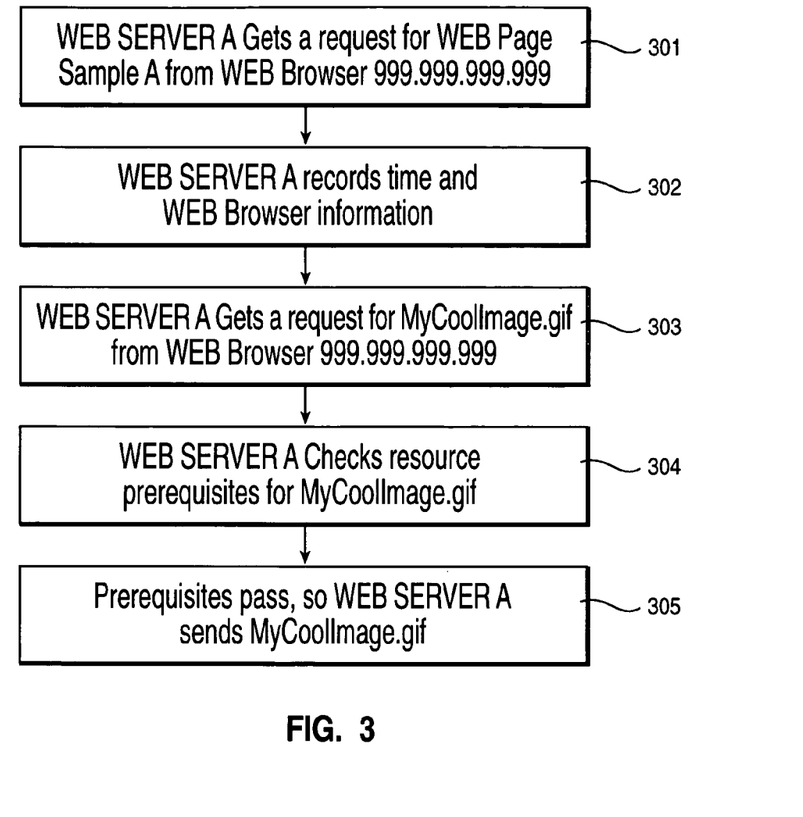
FIG. 3 illustrates the processing path when a user requests Web Page A.

FIG. 3 shows the logical path for a user that requests Web page A 110. At step 301, Web server A receives a request for Original Web Page A 110 from Web browser 999.999.999.999. Web Server A records the time of the request and the Web browser information, such as the IP address, 302. Then, Web server A gets a request for only MyCoolimage.gif from Web browser 999.999.999.999, 303. Web server A checks the resource prerequisites for MyCoolimage.gif, 304. Web server A verifies that this Web browser 999.999.999.999 previously received the prerequisite pages, i.e., Original Web Page A 110 having the two advertisements, so Web server A sends just Mycoolimage.gif to the Web browser, 305. As shown in FIG. 3, the user received the full HTML resource and all of the resources embedded in that HTML script 110.

Figure 4:
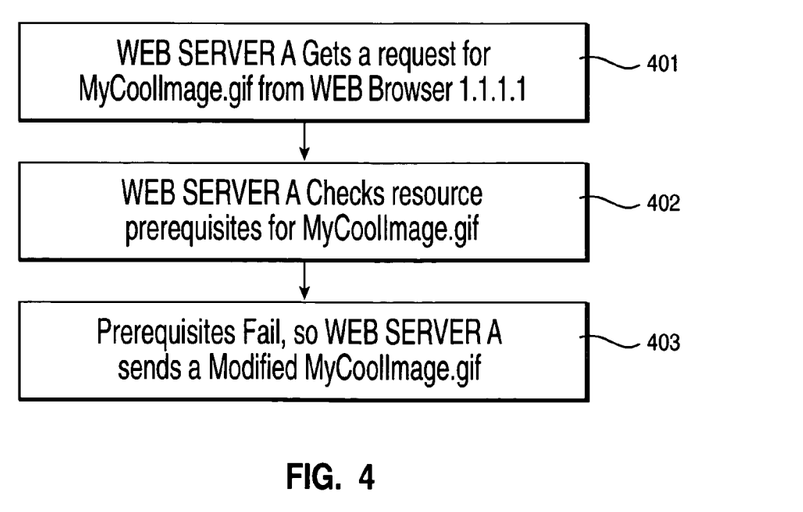
FIG. 4 illustrates the processing path when a user requests Web Page B in order to get the redirected image resource from Web Page A.

FIG. 4 shows the logical path for a user that requests Web page B 120 in order to get the redirected image resource, "Mycoolimage.gif". At step 401, Web server A gets a request for a deep link Mycoolimage.gif from Web browser 1.1.1.1. Web server A checks the resource prerequisites for Mycoolimage.gif, 402. From this scenario, Web server A determines that Web browser 1.1.1.1 has not previously received the prerequisite resource, i.e., Original Web Page A 110. Since the prerequisite test failed, Web server A sends, in this example, a modified Mycoolimage.gif, 403. As shown above, this user will get the HTML page for web page B, i.e., Mycoolimage.gif However, instead of getting the redirected image resource 121 "as is" from Web page A as indicated, the user will get a different resource depending on the algorithm used by Web page A's Web server. The different resource may be either a combination of the resource along with the prerequisite resources, or the different resource may be the requested resource that has been modified to contain any prerequisite information. For example, the prerequisite resource, e.g., advertisements, may be requested by the Web server to be sent to the client before the Web server sends the requested resource. In another embodiment, the user may get a modified requested resource image file that could have the prerequisite information or advertisement embedded inside of it, or just a pointer to web page A. Alternatively, the content producer may only want the requester to know the origins of the resource. In this case, the resource may be modified to contain an attribution to the content provider or the content provider's name and contact information.

Figure 5:
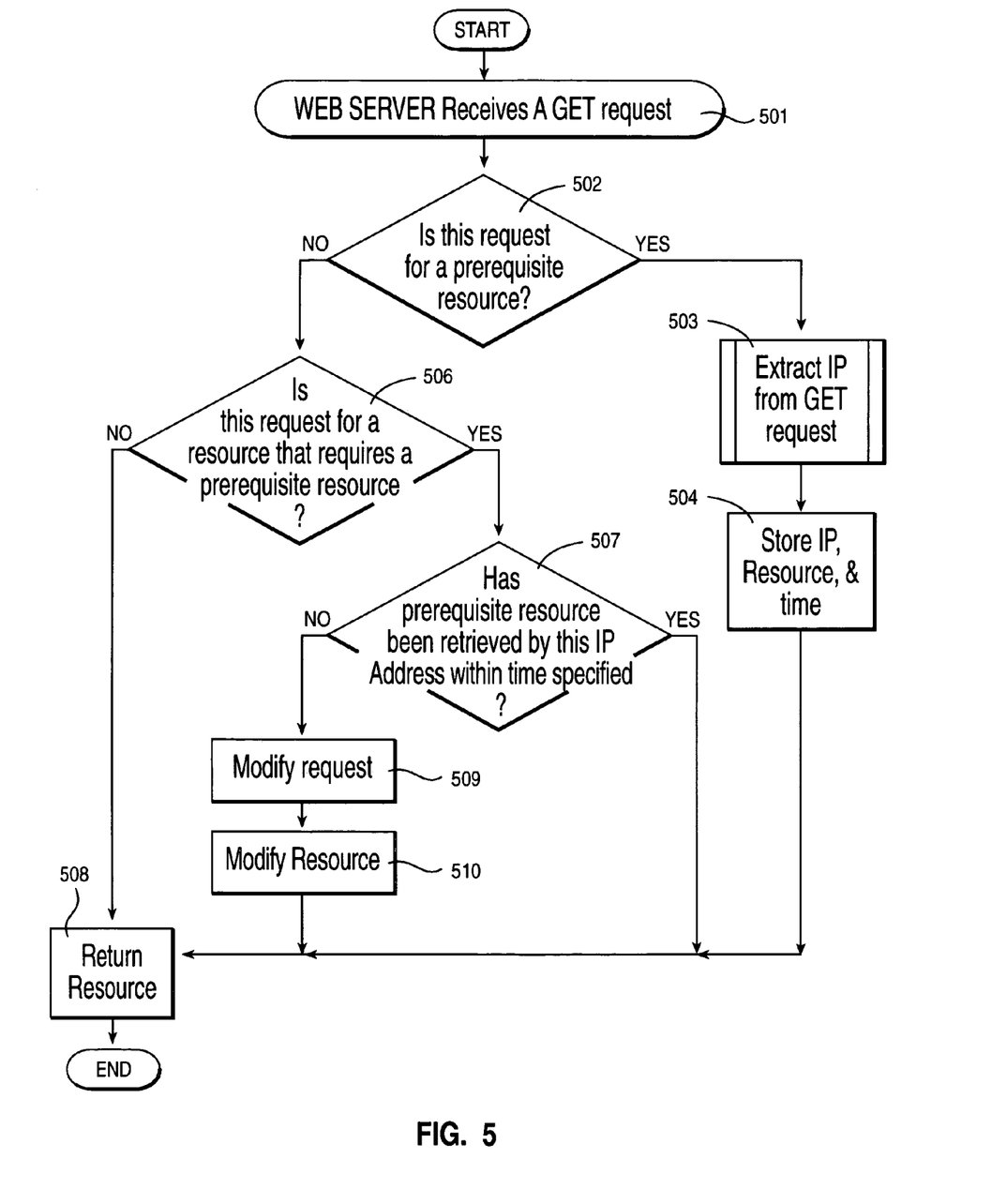
FIG. 5 illustrates the process steps and program function of a Web server servicing requests, and more specifically determining whether to serve the requested resource or to either modify the requested resource or to serve a different resource.

FIG. 5 illustrates the process steps and program function of a Web server servicing requests. Upon receipt of a GET request, 501, the web server code identifies whether a GET request is for a prerequisite resource, 502. If it is a prerequisite resource, the IP address is extracted from the GET request (socket_d.getInetAddress), 503. The IP address, time, and requested resource (index.html) is stored in a hash table, step 504. Then the resource is returned, 508.

Referring back to step 502, if the request is not for a prerequisite resource; then upon receipt of the GET request, it is determined whether the request requires a prerequisite resource, 506. Using the IP address from the GET request information, the hash table is checked for the prerequisite request. The Web server determines if the prerequisite resource has been retrieved by the same IP address within a predetermined period of time, 507 or within some other tracking parameter. If the prerequisite request has been made, the resource is returned, 508. If the prerequisite request has not been made, the web server alters the directory searched for the resource requested causing the request to be modified, 509, so that an alternate resource can be returned, 510.

More specifically, the program function of the Web server program code categorizes every resource as either a non-protected resource or as a protected resource. For example, a prerequisite resource such as a home page (e.g., index.html) may be categorized as a non-protected resource. Furthermore, every resource that is not a home page may be categorized as a protected resource. If the requested resource is determined to be protected, then the Web server determines when the client last requested the home page, i.e., the prerequisite resource. The client is identified by using the five pieces of information for every TCP/IP connection: i) the Server IP address, ii) the Server port number, iii) the Client IP address, iv) the Client port number, and v) the type of connection (stream or datagram). The client's IP address is used as the keyname in a database with the value being the current system time. If there was a request, and it was within the predetermined time period; then the Web server will serve the protected resource. Otherwise, it will serve a different resource that is a modification of the requested resource. A modified requested resource may include the content of the prerequisite resources along with the content of the requested resource.

The requested resource can be modified in several ways. In one embodiment, the text of the prerequisite resources are overlaid onto the content of the requested resource. For example, the link or Web address of the prerequisite resource, or actual text or portions thereof of the prerequisite resource, can be overlaid on the requested resource containing text, graphics, and/or video. In another embodiment, the requested resource is reduced in size or scaled down or represented as an icon and merged into the prerequisite resource. In this way, the user sees the prerequisite resource, such as an advertisement, and then has to select the icon, or enlarge the requested resource, in order to view the requested resource after having viewed the prerequisite resource. In an alternative embodiment, each prerequisite resource can be reduced in size and merged with the content of the requested resource. If the requested resource does not contain space to contain the reduced prerequisite resource, the requested resource, or portions thereof, may also be reduced in size. In an embodiment such as this though, the prerequisite resource is not as readily viewable by the user.

In yet another embodiment, the requested resource can be sent using a, lesser quality resolution such as a smaller resolution, or using a lesser color depth, e.g., going from 24 to 8 bits, or using monochrome instead of color. The user would get the best resolution quality of the requested resource after the user first views any prerequisite resource. Therefore, there is an incentive for the user to first view any prerequisite resource.

In other embodiments, instead of sending the requested resource, the prerequisite resource may be sent along with instructions on the links to follow to get to the requested resource, as described in commonly assigned application Ser. No. 09/439,053 filed Nov. 12, 1999 and issued as U.S. Pat. No. 6,539,424 and herein incorporated by reference.

Although the above described preferred embodiment makes a determination of whether or not to serve a protected resource based upon whether or not the prerequisite resources have been previously served within a predetermined time period, other embodiments may utilize other criteria with respect to the prerequisite resources. For example, another embodiment may take into consideration the situation where the Web server determines that the requests are coming from a search engine or other robot. Such a determination can be made by identifying a high frequency of requests from a same IP address. When the requests are coming from a robot, the actual results are being further promulgated to a multitude of diverse clients. Most likely, a previously requested prerequisite resource would not necessarily have been served to the same client that is getting the protected resource. To account for this, a Web server may decide to serve the prerequisite resource with every request for a protected resource. This will ensure that every client receiving the protected resource from the robot will also be receiving the prerequisite resource. In other embodiments, the Web server may send the prerequisite resource after a predetermined number of hits for the protected resource.

There are several embodiments that can be utilized to determine the prerequisite resources, if any, of any given requested resource. For example, a database may contain each protected resource along with an identification of each prerequisite resource. As such, associations are stored between prerequisite resources and resources that are not allowed to be served. A given resource may have more than one prerequisite resources, and more than one resource may have the same prerequisite resource. If the protected resource is requested, the server determines, from the database, each prerequisite resource associated with that protected resource. If any of the prerequisite resources have not yet been served, the server sends them to the client before or in conjunction with the requested protected resource, such as by modifying the requested protected resource.

In another embodiment, the prerequisite resource may be served by modifying the requested resource. The modified requested resource can be served by utilizing, by the server, two or more directories wherein each directory uses the same identifiers for the resources. One directory may contain the requested resource, which is used if the prerequisite resource has previously been served; and another directory may contain the requested resource as modified as described above in combination with the prerequisite resource. For example, the Web server may store in Directory A, a Web page having a first protected main attraction image source. The protected main attraction image source may have prerequisite resources including two advertisements. The Web server would have in Directory B a Web page having a layout with an image source for one of the advertisements, then the main attraction image source, and then an image source for the other advertisement. If a protected resource is requested, and the prerequisite resources have not been served as required, then the Web server would serve the requested resource from Directory B. If the prerequisite resource has been served, the Web server would serve the requested resource using Directory A which contains only the requested resource and not any of the prerequisite resources embedded therein. In the above described embodiment, a different directory is utilized to access the same file name with the changed content.

Another embodiment also determines the prerequisite resources of a requested protected resource. Then, at the time a protected resource is requested, the Web server can determine each prerequisite resource that may need to be served. This is especially needed if separate directories as described above have not been previously created, and any prerequisite resources are merged with the requested resource dynamically in response to the requests.

It should be noted that these features, determining the prerequisite resources and serving modified content of a requested resource which contains the prerequisite resources, can be achieved using other embodiments such as those employing mapping tables, database lookups, hard coded values, or other techniques.

Figure 6A:
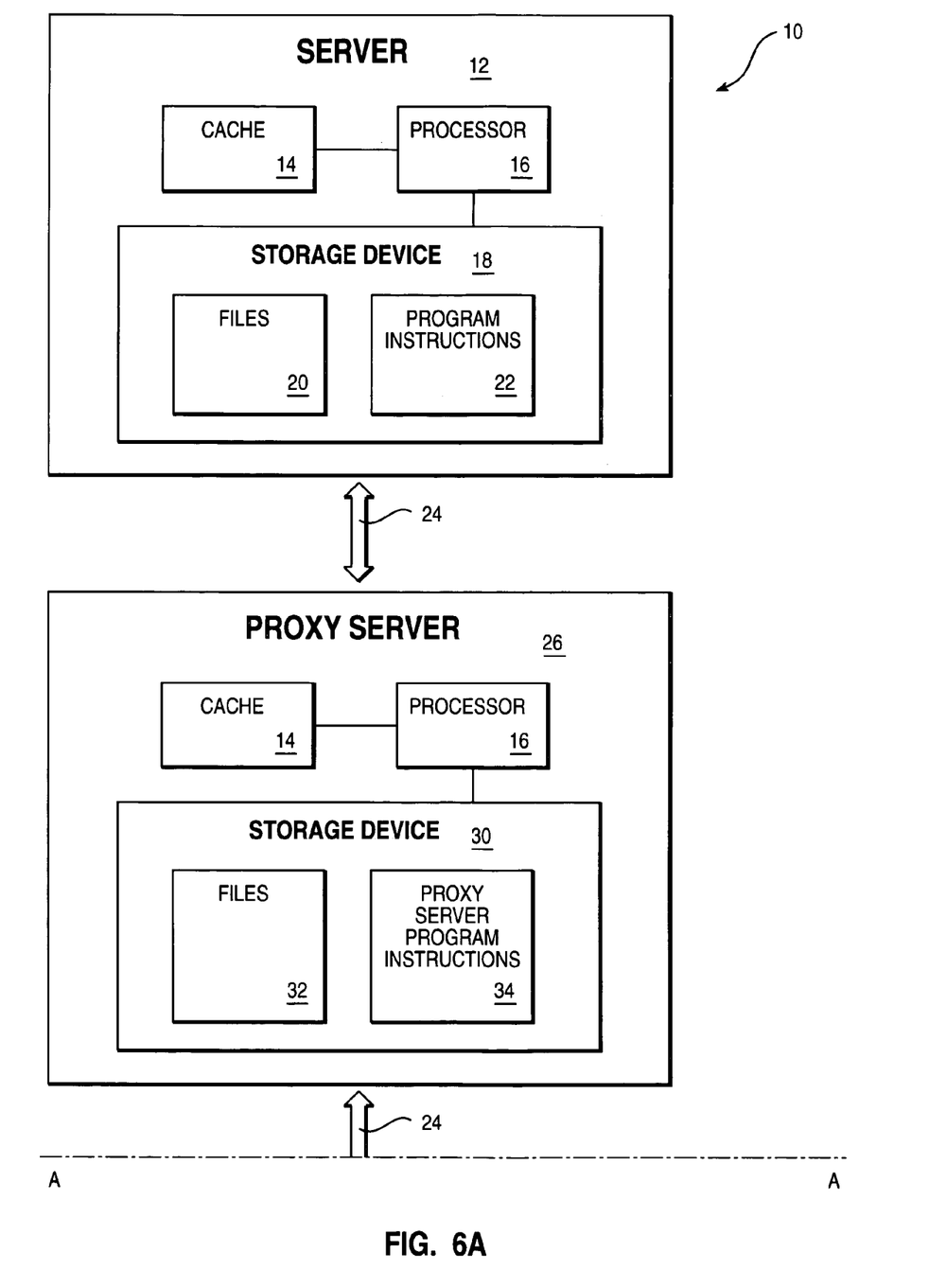
FIG. 6 is a block diagram of computational devices in a client/server network such as the Internet.
Figure 6B:
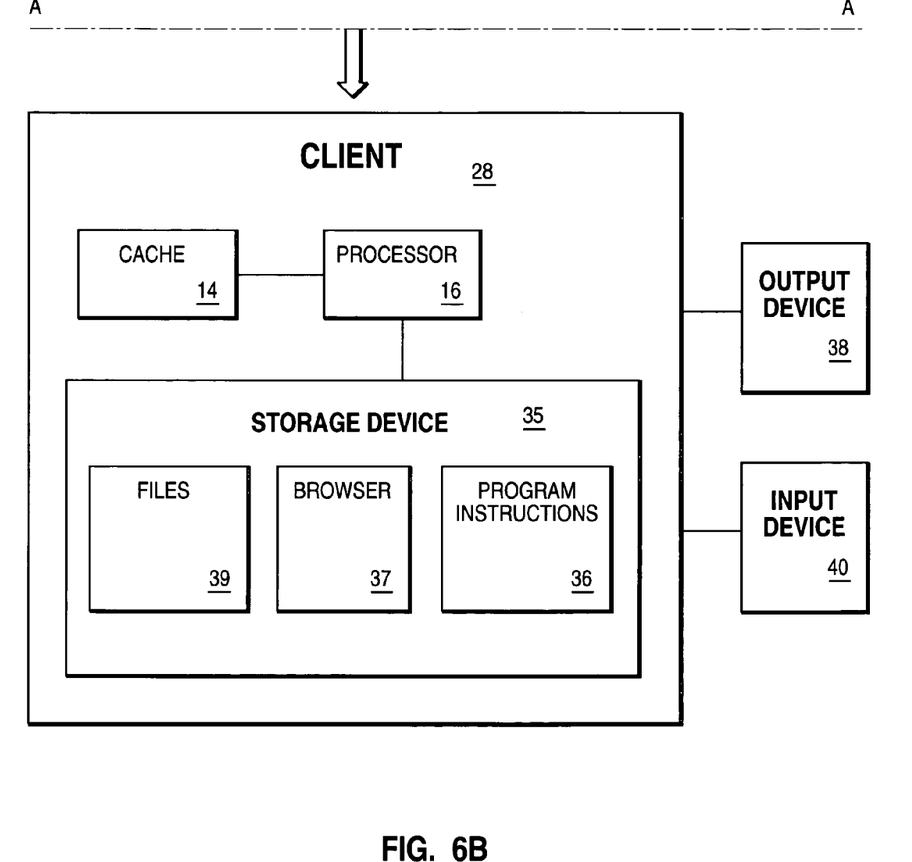

FIG. 6 illustrates an embodiment of a system 10 for transferring information within a client/server network. System 10 includes computational devices used as a network server, a proxy and a client. A computational device may be, but is not limited to, a personal computer, laptop, workstation, mainframe or hand held computer including palmtops, personal digital assistants, smart phones, and/or cellular phones. In the embodiment of FIG. 6, server 12 includes cache 14, processor 16 and storage device 18. Cache 14 is a collection of storage locations which are rapidly accessible by processor 16. In an embodiment, cache 14 may be a portion of the processor's system memory allocated for temporary storage. Storage device, or storage medium, 18 may take many forms, such as volatile and/or nonvolatile memory or any combination thereof. Volatile memory may be any suitable volatile memory device, e.g., RAM, DRAM, SRAM. Nonvolatile memory may include storage space, e.g., via the use of hard disk drives or tapes. Some example storage mediums include a magnetic disk, a hard drive or floppy drive, an optical disk, and/or magnetic tape. Such a storage device is sometimes referred to as a "direct access storage device" (DASD). Typically, storage device 18 has a larger storage capacity than cache 14, but takes longer for processor 16 to access.

In the embodiment of FIG. 6, storage device 18 includes files 20 and program instructions 22, also referred to as program executables. The program instructions are typically stored as "executable files" in a storage device and loaded into memory during execution. Files 20 may include documents such as Web pages suitable for viewing by a user of the network, and may contain text, graphics, video and/or audio information. Such document files may be in the HTML language, or in other suitable languages such as Extensible Markup Language (XML) or Wireless Markup Language (WML). Files 20 may further include data files suitable for use by computational devices in communicating across the network. "Files" as used herein may refer to any collection of data suitable for storing on a computational device or transferring within a network. Program instructions 22 may include various program instructions used to implement functions of network server 12, such as program instruction used to implement the methods described herein.

Transmission medium 24 may be used to connect network server 12 to other computational devices, such as proxy server 26 and/or client 28. Transmission medium 24 may include, for example, a wire, cable, wireless transmission path, or a combination of these. Protocols used for transmission medium 24 may include TCP/IP, HTTP, and/or other suitable protocols such as Wireless Applications Protocol (WAP).

System 10 may include client 28, linked to server 12 using transmission medium 24. In the embodiment of FIG. 6, client 28 includes cache 14, processor 16, and storage device 35. Storage device 35 is similar to storage device 18 described above, and may include files 39, a browser program 37 and program instructions 36. Program instructions can include operating system program instructions and application program instructions. Although a browser program such as browser 37 is implemented using program instructions (or executables) such as instructions 36, browser 37 is shown separately in FIG. 7 to emphasize this feature of the client. Browser program 37 may be, for example, a web browser which allows a user to retrieve and view files on the World Wide Web (WWW, or a program which performs a similar function on some other network. In some embodiments, client functions involved in implementation of the methods described herein are included in browser 37. Such functions, and/or other functions of the client computing device, may also be implemented in separate program instructions such as program instructions 36. Files 39 may include various files stored on the client computational device, including files downloaded from a network server such as server 12. Client 28 is typically associated with an output device 38 and input device 40, particularly in embodiments for which the client computational device is operated by a user of the system 10. Output device 38 may include, for example, a display screen and/or a printer. Input device 40 may include, for example, a keyboard, voice input system, touch sensitive device, and/or a pointing device such as a mouse, track ball, light pen, pen-stylus, and/or any other input means.

In some embodiments, system 10 may also include a proxy server 26. A proxy server as used herein refers to a computational device which acts as an intermediary between a client and a "real" server. The proxy server may appear as a server to the client, and as a client to the real server. Requests from the client may be responded to by the proxy server, or passed on to the real server. Files or other communications from the real server may be passed on to the client by the proxy server. A proxy server may be employed in system 10 for various reasons. For example, proxy servers may be used to provide specialized content and/or improved performance to a selected group of client computers. An example of this may be the use of caching by proxy servers to increase the speed of providing some files to subscribers to a particular Internet Service Provider (ISP). Another use of a proxy server may be to filter the information being sent from the client to a real server, and/or from the real server to the client. In the embodiment of FIG. 7, proxy server 26 includes cache 14, processor 16, and storage device 30. Storage device 30 may include files 32 and proxy server program instructions 34. Files 32 may include any files stored on the proxy server, such as files being transmitted between a server and a client. Program instructions 34 may include various program instructions used to implement functions of proxy server 26, such as interacting with client computers.

In FIG. 6 and in any other block diagrams appearing herein, the blocks are intended to represent functionality rather than specific structure. Implementation of the represented system using circuitry and/or software could involve a combination of multiple blocks into a single circuit or device, or a combination of multiple circuits and/or devices to realize the function of a block. For example, cache 14 may be included on a semiconductor chip embodying processor 16. Furthermore, a system such as system 10 may include other elements not explicitly shown. For example, multiple servers, proxy servers, and/or clients not shown in FIG. 6 may be included in a system used for implementing the methods and functions described herein. Further, the server, proxy server, and/or client computational devices may themselves include additional elements not shown.

The exemplary embodiment shown in FIG. 6 is provided solely for the purposes of explaining the preferred embodiments of the invention; and those skilled in the art will recognize that numerous variations are possible, both in form and function. For instance, any one or more of the following—the processor and/or memory and/or the input/output devices—could be resident on separate systems such as in a network environment.

The preferred embodiments may be implemented as a method, system, or article of manufacture using standard programming and/or engineering techniques to produce software, firmware, hardware, or any combination thereof. The term "article of manufacture" (or alternatively, "computer program product") as used herein is intended to encompass data, instructions, program code, and/or one or more computer programs, and/or data files accessible from one or more computer usable devices, carriers, or media. Examples of computer usable mediums include, but are not limited to: nonvolatile, hard-coded type mediums such as CD-ROMs, DVDs, read only memories (ROMs) or erasable, electrically programmable read only memories (EE-PROMs), recordable type mediums such as floppy disks, hard disk drives and CD-RW and DVD-RW disks, and transmission type mediums such as digital and analog communication links, or any signal bearing media.

The foregoing description of the preferred embodiments of the invention has been presented for the purposes of illustration and description. It is not intended to be exhaustive or to limit the invention to the precise form disclosed. Many modification and variations are possible in light of the above teaching. For example, although preferred embodiments of the invention have been described in terms of the Internet, other network environments including but not limited to wide area networks, intranets, and dial up connectivity systems using any network protocol that provides basic data transfer mechanisms may be used.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by Letters Patent is set forth in the following claims.

What is claimed is:

1. A method, in a server data processing system, for servicing a request for a resource requested by a client data processing system, comprising:
    receiving the request for the resource from a requester;
    determining if the resource requires at least one prerequisite resource, and if the at least one prerequisite resource has been previously requested by the requester; and
    sending a different resource having a content combining the requested resource content and at least a portion of content of at least one prerequisite resource if the requested resource requires the prerequisite resource.

2. The method of claim 1 further comprising keeping track of each request made for the at least one prerequisite resource for each requester within a tracking parameter.

3. The method of claim 2 wherein the tracking parameter is for a predetermined amount of time.

4. The method of claim 3 wherein the predetermined amount of time is a configurable amount of time.

5. The method of claim 2 wherein the tracking parameter is for a predetermined number of requests for the requested resource.

6. The method of claim 2 further comprising determining if a previous request has been made by the requester for the prerequisite resource within the tracking parameter if the requested resource requires a prerequisite resource.

7. The method of claim 6 wherein the different resource is sent if the resource requires a prerequisite resource and if it is determined that any previous request by the requester for the prerequisite resource has not been made within the tracking parameter.

8. The method of claim 1 wherein the determining step further comprises determining which at least one resource is the at least one prerequisite resource.

9. The method of claim 1 wherein the content of the different resource comprises overlaying at least a portion of the prerequisite resource on the content of the requested resource.

10. The method of claim 1 wherein the content of the different resource comprises merging the content of the prerequisite resource with the content of the requested resource.

11. The method of claim 1 wherein the content of the different resource comprises changing a resolution of the requested resource to a lesser quality.

12. The method of claim 1 wherein the content of the different resource comprises changing color depth.

13. A method, in a client data processing system, for receiving a resource in response to a request to a server data processing system, comprising:
    sending the request; and
    receiving a different resource than the requested resource if the requested resource was a deep hyperlink wherein the different resource has a content combining the requested resource content with at least a portion of another resource content wherein the requested resource can be reached by following links from the another resource content.

14. A server data processing system having means for servicing a request for a resource requested by a client data processing system, the server data processing system comprising;
    means for receiving the request for the resource from a requester;
    means for determining if the resource requires at least one prerequisite resource, and if the at least one prerequisite resource has been previously requested by the requester; and
    means for sending a different resource having a content combining the requested resource content and at least a portion of content of at least one prerequisite resource if the requested resource requires the prerequisite resource.

15. The data processing system of claim 14 further comprising means for keeping track of each request made for the at least one prerequisite resource for each requester within a tracking parameter.

16. The data processing system of claim 15 further comprising means for determining if a previous request has been made by the requester for the prerequisite resource within the tracking parameter if the requested resource requires a prerequisite resource.

17. A client data processing system, having means for receiving a resource in response to a request to a server data processing system, the client data processing system comprising;
    means for sending the request; and
    means for receiving a different resource than the requested resource if the requested resource was a deep hyperlink wherein the different resource has a content combining the requested resource content with at least a portion of another resource content wherein the requested resource can be reached by following links from the another resource content.

18. A program, having computer readable program code means, on a computer usable medium, at a server data processing system, for servicing a request for a resource requested by a client data processing system, comprising;
    instruction means enabling receipt of the request for the resource from a requester; instruction means causing a determination of whether the resource requires at least one prerequisite resource, and if the at least one prerequisite resource has been previously requested by the requester; and instruction means enabling a sending of a different resource having a content combining the requested resource content and at least a portion of content of at least one prerequisite resource if the requested resource requires the prerequisite resource.

* * * * *